United States Patent
Guo et al.

(10) Patent No.: US 11,935,698 B2
(45) Date of Patent: Mar. 19, 2024

(54) DIELECTRIC CERAMIC COMPOSITION AND MULTI-LAYERED CERAMIC CAPACITOR COMPRISED THEREOF

(71) Applicant: KEMET Electronics Corporation, Fort Lauderdale, FL (US)

(72) Inventors: Hanzheng Guo, Simpsonville, SC (US); Abhijit Gurav, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 31 days.

(21) Appl. No.: 17/586,027

(22) Filed: Jan. 27, 2022

(65) Prior Publication Data
US 2022/0238277 A1    Jul. 28, 2022

Related U.S. Application Data
(60) Provisional application No. 63/142,766, filed on Jan. 28, 2021.

(51) Int. Cl.
| | |
|---|---|
| *H01G 4/12* | (2006.01) |
| *C04B 35/468* | (2006.01) |
| *C04B 35/64* | (2006.01) |
| *H01G 4/008* | (2006.01) |
| *H01G 4/012* | (2006.01) |
| *H01G 4/30* | (2006.01) |

(52) U.S. Cl.
CPC ....... *H01G 4/1227* (2013.01); *C04B 35/4682* (2013.01); *C04B 35/64* (2013.01); *H01G 4/008* (2013.01); *H01G 4/012* (2013.01); *H01G 4/30* (2013.01)

(58) Field of Classification Search
CPC ........ C04B 35/4682; C04B 2235/6583; C04B 2235/66; H01G 4/008; H01G 4/012; H01G 4/1227; H01G 4/30
See application file for complete search history.

(56) References Cited

U.S. PATENT DOCUMENTS
| | | | |
|---|---|---|---|
| 9,564,271 | B2 | 2/2017 | Banno et al. |
| 10,710,934 | B2 | 7/2020 | Banno |
| 11,056,283 | B2 | 7/2021 | Matsushita |
| 2005/0117274 | A1 | 6/2005 | Miyauchi et al. |
| 2006/0063009 | A1 | 3/2006 | Naitou et al. |

(Continued)

OTHER PUBLICATIONS
ISA/US; International Search Report and Written Opinion prepared for PCT/US22/14032; dated Jun. 2, 2022.

*Primary Examiner* — Nathan Milakovich
(74) *Attorney, Agent, or Firm* — Joseph T. Guy; Patent Filing Specialist Inc.

(57) ABSTRACT

This invention relates to a multilayer ceramic capacitor produced by alternatively stacking the ceramic dielectric layers and internal electrodes mainly comprise base metals. The present dielectric ceramic composition having a main component with a perovskite structure $ABO_3$ formula of:

$$(K_xNa_yLi_zA_{1-x-y-z})_m(Nb_uTa_v)O_3$$

wherein:
A, B, x, y, z, u, v, w, m, u, v and w are defined further.
The dielectric ceramic composition further contains:
a first accessory ingredient composes at least one selected from the rare-earth compounds; a second accessory ingredient composes at least one selected from transition metal compounds; and a third accessory ingredient.

32 Claims, 1 Drawing Sheet

(56) References Cited

U.S. PATENT DOCUMENTS

| | | |
|---|---|---|
| 2010/0008019 A1 | 1/2010 | Burn |
| 2010/0102679 A1* | 4/2010 | Kawada ............... H10N 30/877 |
| | | 310/365 |
| 2013/0162108 A1 | 6/2013 | Sone et al. |
| 2013/0162109 A1* | 6/2013 | Hatano ............... H10N 30/8542 |
| | | 252/62.9 PZ |
| 2016/0005541 A1* | 1/2016 | Banno .................... H01G 4/224 |
| | | 156/89.15 |
| 2019/0189904 A1 | 6/2019 | Benedict et al. |
| 2019/0237263 A1 | 8/2019 | Kaneda et al. |
| 2022/0234958 A1* | 7/2022 | Guo ..................... H01G 4/1254 |

* cited by examiner

DIELECTRIC CERAMIC COMPOSITION AND MULTI-LAYERED CERAMIC CAPACITOR COMPRISED THEREOF

CROSS-REFERENCE TO RELATED APPLICATIONS

This application claims priority to U.S. Provisional Application No. 63/142,766 filed Jan. 28, 2021 which is incorporated herein by reference.

FIELD OF THE INVENTION

This invention is related to a dielectric ceramic composition and multilayer ceramic capacitors containing the same. The disclosed dielectric ceramic composition can be co-fired with base metal internal electrodes in reducing atmosphere. The multilayer ceramic capacitors manufactured thereof are advantageously used for the application at high temperatures.

BACKGROUND

With a rapid development and popularization of information and electronic technology over the past two decades, the multilayer ceramic capacitor industry thrives on the increasing demand of electrical energy storage devices in numerous applications, such as portable electronics, personal computers, cellular phones, televisions and the like. In these cases, barium titanate $BaTiO_3$ has been overwhelmingly used as the essential ceramic dielectric material owing to its high dielectric constant, low dielectric loss, and stable capacitance variation over a temperature range from −55° C. to 125° C. However, as a ferroelectric material, $BaTiO_3$ experiences a well-known Curie transition around 125° C., yielding a significant reduction of dielectric constant along with an abrupt drop of the temperature coefficient of capacitance. Nowadays, with the emerging of new electronic applications at extreme environments, such as engine control units, down-hole drilling exploration, pulse power electronics and so on, require maintaining a stable capacitance in a maximum working temperature window of 175° C.-200° C. or even higher. Even though tremendous research activities have been performed to stabilize the temperature-capacitance characteristic of $BaTiO_3$-based capacitors via extensive doping modification packages, the extended working temperature is still limited to around 150° C. Therefore, it has attracted considerable attentions to develop new dielectric materials that can enable harsh environment applications at 175° C.-200° C. or above. Among various candidates, alkaline niobate-based ceramics have been found feasible to develop high temperature capacitors owing to their high Curie transition temperatures. For example, such a Curie transition takes place around 410° C. in $(K_{0.5}Na_{0.5})NbO_3$ ceramics. Detailed firing studies and defect chemistry investigations have demonstrated that alkaline niobate-based ceramics are capable of: (1) co-firing with base metals, such as Cu and Ni, in reducing atmosphere owing to well-tailored chemical thermodynamics to mitigate the volatility of alkaline elements; and (2) producing multilayer structured electronic device with base metal internal electrodes. For example, in U.S. Pat. No. 9,564,271 and WO 2018/062084A1, laminated ceramic capacitor condensers with Ni internal electrodes were respectively formed using a $(K,Na)NbO_3$-based and a $NaNbO_3$-based dielectric ceramic composition.

In spite of the extensive effort there is still a desire for an improved ceramic dielectric, particularly one that is suitable for use in a multi-layered ceramic capacitor, suitable for use at high voltage and at high temperature.

SUMMARY OF THE INVENTION

Provided herein is a dielectric ceramic which is particularly suitable for use at high temperatures.

Also provided herein is a multilayered ceramic capacitor comprising a dielectric ceramic wherein the capacitor is suitable for use at high temperatures.

These and other advantages, as will be realized, are provided in a dielectric ceramic composition comprising a primary component defined by:

$$(K_xNa_yLi_zA_{1-x-y-z})_m(Nb_uTa_vB_w)O_3$$

wherein:
A is at least one element selected from the group consisting of Ca, Sr, and Ba;
B is at least one element selected from the group consisting of Ti, Zr, Hf and Sn;
x, y, z, u, v, and w are molar fractions of respective elements;
m is the molar ratio of A-site and B-site elements;
$0.95 \leq m \leq 1.05$;
$0.05 \leq x \leq 0.90$;
$0.05 \leq y \leq 0.90$;
$0.00 \leq z \leq 0.12$
$0 < u < 1$;
$0.0 \leq w \leq 0.3$; and
$u+v+w=1$;
a first accessory ingredient comprising at least one rare-earth element selected from the group consisting of Y, Sc, La, Ce, Pr, Nd, Sm, Eu, Gd, Tb, Dy, Ho, Er, Tm, Yb and Yu;
a second accessory ingredient comprising at least one transition metal element selected from the group consisting of V, Cr, Mo, W, Mn, Fe, Co, Ni, Cu, and Zn; and
a third accessory ingredient comprising a frit.

Yet another embodiment is provided in a multilayered ceramic capacitor comprising:
a plurality of dielectric ceramic layers wherein each layer has a dielectric composition defined by;

$$(K_xNa_yLi_zA_{1-x-y-z})_m(Nb_uTa_vB_w)O_3$$

wherein:
A is at least one element selected from the group consisting of Ca, Sr, and Ba;
B is at least one element selected from the group consisting of Ti, Zr, Hf and Sn;
x, y, z, u, v, and w are molar fractions of respective elements;
m is the molar ratio of A-site and B-site elements;
$0.95 \leq m \leq 1.05$;
$0.05 \leq x \leq 0.90$;
$0.05 \leq y \leq 0.90$;
$0.00 \leq z \leq 0.12$
$0 < u < 1$;
$0.0 \leq w \leq 0.3$; and
$u+v+w=1$;
a first accessory ingredient comprising at least one rare-earth element selected from the group consisting of Y, Sc, La, Ce, Pr, Nd, Sm, Eu, Gd, Tb, Dy, Ho, Er, Tm, Yb and Yu;

a second accessory ingredient comprising at least one transition metal element selected from the group consisting of V, Cr, Mo, W, Mn, Fe, Co, Ni, Cu, and Zn; and a third accessory ingredient comprising a frit;

and a plurality of internal electrodes comprising base metals of Ni, Cu or alloys thereof;

and a pair of external electrodes formed at each end of the capacitor element main body.

Yet another embodiment is provided in a method of forming a multilayered ceramic capacitor comprising:

forming a dielectric ceramic precursor;

interleaving layers of said dielectric ceramic precursor with layers of metal to form a stack;

compressing said stack and sintering the dielectric precursor to form dielectric ceramic layers having a composition defined by:

a primary component defined as:

$$(K_xNa_yLi_zA_{1-x-y-z})_m(Nb_uTa_vB_w)O_3$$

wherein:

A is at least one element selected from the group consisting of Ca, Sr, and Ba;

B is at least one element selected from the group consisting of Ti, Zr, Hf and Sn;

x, y, z, u, v, and w are molar fractions of respective elements;

m is the molar ratio of A-site and B-site elements;

$0.95 \leq m \leq 1.05$;

$0.05 \leq x \leq 0.90$;

$0.05 \leq y \leq 0.90$;

$0.00 \leq z \leq 0.12$ $0 < u < 1$;

$0.0 \leq w \leq 0.3$; and $u+v+w=1$;

a first accessory ingredient comprising at least one rare-earth element selected from the group consisting of Y, Sc, La, Ce, Pr, Nd, Sm, Eu, Gd, Tb, Dy, Ho, Er, Tm, Yb and Yu;

a second accessory ingredient comprising at least one transition metal element selected from the group consisting of V, Cr, Mo, W, Mn, Fe, Co, Ni, Cu, and Zn; and a third accessory ingredient comprising a frit.

DESCRIPTION

This invention is specific to an alkaline niobite-based dielectric ceramic composition with a further doping package of transition metal and rare-earth elements. It has been generally known that doping or co-doping of transition metal elements and/or rare-earth elements is beneficial to tweak the defect chemistry landscape of electro-ceramic materials from microstructural perspective, and thus manipulate the macroscopic electrical properties, such as insulation resistance and long-term life reliability. The present dielectric ceramic composition is capable of co-firing with inexpensive electrodes mainly comprises base metals in low oxygen partial pressure, and thereby produce a multilayer ceramic capacitor that is possible for high temperature applications.

The present invention is specific to a dielectric ceramic composition that enables an excellent temperature-capacitance characteristic from low to high temperatures. Specifically, capacitors made by the disclosed dielectric ceramic composition is possible to have a temperature coefficient of capacitance within ±50% over a temperature range from −55° C. to 200° C. and more preferably ±20% over a temperature range from −55° C. to 200° C., relative to capacitance at 25° C.

The dielectric constant of the dielectric ceramic composition has a dielectric constant of at least 300, and more preferably at least 1000, at 25° C. to no more than 2000.

The present invention is also specific to a dielectric ceramic composition that is compatible to co-fire with internal electrode using inexpensive base metals such as Ni and the like in reducing atmosphere.

The present invention is also specific to a multilayered ceramic capacitor formed by a plurality of laminated ceramic layers and a plurality of internal electrode layers in a pattern that the ceramic layers and internal electrode layers are alternatively stacked. The ceramic layers are made by the present dielectric ceramic composition, and the internal electrodes layers are made by conductive paste mainly containing base metals such as Ni and the like. The obtained multilayer ceramic capacitor is possible to have a temperature coefficient of capacitance within ±15% over a temperature range from −55° C. to 200° C. after co-firing at low oxygen partial pressures.

The abovementioned objectives are achieved in a multilayer ceramic capacitor device with dielectric ceramic composition having a main component with a perovskite structure $ABO_3$ formula of:

$$(K_xNa_yLi_zA_{1-x-y-z})_m(Nb_uTa_vB_w)O_3$$

wherein:

A is at least one element selected from the alkaline earth element group of Ca, Sr, and Ba;

B is at least one element selected from the group of Ti, Zr, Hf and Sn; and wherein:

x, y, z, u, v, and w are molar fractions of respective elements, and m is the molar ratio of A-site and B-site elements;

$0.95 \leq m \leq 1.05$;

$0.05 \leq x \leq 0.90$;

$0.05 \leq y \leq 0.90$;

$0 \leq z \leq 0.12$;

$0 < u < 1$; $0.0 \leq w \leq 0.3$; $u+v+w=1$

The ceramic composition further comprises a first accessory ingredient comprising at least one element selected from the rare-earth compounds, wherein the rare-earth element is no more than 10 mole parts with respect to 100 mole parts of the main component.

The ceramic composition further comprises a second accessory ingredient comprising at least one element selected from the transition metals, wherein the transition metal element is in the range of 0.05 mole to 10.00 mole parts with respect to 100 mole parts of the main component.

The ceramic composition further comprises a third accessory ingredient comprising a compound with low melting temperature to assist the ceramic sintering process, also referred to as a frit, which is within the range of 0.01 mole to 15.00 mole parts with respect to 100 mole parts of the main component.

To obtain the disclosed dielectric ceramic composition, (1) a precursor is firstly prepared upon calcination; a precursor here is defined as an intermediate compound or a group of compounds that is produced from certain raw ceramic powders, wherein the precursor may contain all or partial constituent elements of the final composition, but the final form of the material is not obtained until the precursor is further mixed with other reactants and treated under certain thermal conditions to achieve the desired chemistry; (2) then a mixture of the obtained precursor and other dopants such as transition metal compound, rare-earth compound, and frit, is further prepared in the form of a paste with the assistance of various organic blends prior to sintering; and (3) lastly, a composition comprising the obtained paste mixture forms a dielectric ceramic material disclosed in this invention upon a sintering process. One example has been listed in TABLE 1. The precursor mainly contains $(K_{0.5}Na_{0.5})NbO_3$—$BaZrO_3$ ceramic, which is prepared upon calcination by pre-reacted oxides and carbonates such as $K_2CO_3$, $Na_2CO_3$, $BaCO_3$, $Nb_2O_5$, and $ZrO_2$. The inorganic dopants used to form the paste prior sintering are $MnCO_3$, $Nd_2O_3$, and $SiO_2$.

TABLE 1

| Compounds used to form a precursor | $K_2CO_3$, $Na_2CO_3$, $BaCO_3$, $Nb_2O_5$, $ZrO_2$ |
|---|---|
| Dopants | $MnCO_3$, $Nd_2O_3$, $SiO_2$ |

The dielectric ceramic material may also be obtained by another route beginning with more than one precursor, as exemplified in TABLE 2, using the same starting raw materials as in TABLE 1. In this case, two precursors, mainly $(K_{0.5}Na_{0.5})NbO_3$ for precursor 1 and $BaZrO_3$ for precursor 2, are made separately by calcination. Then, a paste is formed by a blend of $(K_{0.5}Na_{0.5})NbO_3$, $BaZrO_3$, $MnCO_3$, $Nd_2O_3$, and $SiO_2$, together with organic mixtures. After sintering, the formulation of TABLE 2 will result in approximately the same dielectric material composition as that made by the formulation of TABLE 1.

TABLE 2

| Compounds used to form precursor 1 | $K_2CO_3$, $Na_2CO_3$, $Nb_2O_5$ |
|---|---|
| Compounds used to form precursor 2 | $BaCO_3$, $ZrO_2$ |
| Dopants | $MnCO_3$, $Nd_2O_3$, $SiO_2$ |

The invention will be more fully described in the following examples to which illustrate, but do not limit the scope, of this invention. These examples, however, are indicative of just a few of the various ways in which the principles of the invention may be adopted.

The dielectric ceramic composition of this invention comprises a main component together with accessory ingredients, wherein the main component has a perovskite structure $ABO_3$ formula expressed by:

$$(K_xNa_yLi_zA_{1-x-y-z})_m(Nb_uTa_vB_w)O_3 \quad (1)$$

wherein:
A is at least one element selected from the alkaline earth element group of Ca, Sr, and Ba.
B is at least one element selected from the group of Ti, Zr, Hf and Sn.
In formula (1), x, y, z, u, v, and w are molar fractions of respective elements, and m is the molar ratio of A-site and B-site elements. The subscripts are in the following respective ranges:
$0.95 \leq m \leq 1.05$;
$0.05 \leq x \leq 0.90$;
$0.05 \leq y \leq 0.90$;
$0.00 \leq z \leq 0.12$;
$0 < u < 1$;
$0.0 \leq w \leq 0.3$; and
$u+v+w=1$.

The ceramic composition further comprises a first accessory ingredient comprising at least one compound containing rare-earth elements: Y, Sc, La, Ce, Pr, Nd, Sm, Eu, Gd, Tb, Dy, Ho, Er, Tm, Yb and Yu. The amount of the rare-earth element is no more than 10 mole parts with respect to 100 mole parts of the main component. The values of molar friction are calculated on a basis of $YO_{3/2}$, $ScO_{3/2}$, $LaO_{3/2}$, $CeO_2$, $PrO_{11/6}$, $NdO_{3/2}$, $SmO_{3/2}$, $EuO_{3/2}$, $GdO_{3/2}$, $TbO_{7/4}$, $DyO_{3/2}$, $HoO_{3/2}$, $ErO_{3/2}$, $TmO_{3/2}$, $YbO_{3/2}$ and $LuO_{3/2}$.

The ceramic composition further comprises a second accessory ingredient comprising at least one compound containing transition metal elements: V, Cr, Mo, W, Mn, Fe, Co, Ni, Cu, and Zn; preferably such compound contains at least one of V, Mo, W, Cr and Mn. Amount of the rare-earth element is in the range of 0.05 mole to 10.00 mole parts with respect to 100 mole parts of the main component;

The ceramic composition further comprises a third accessory ingredient comprising a compound with low melting temperature, also referred to as a frit, to assist the ceramic sintering process, and at least one frit is selected from fluorides such as LiF, NaF, KF, and $MgF_2$, silicates such as Si, $SiO_2$, and $(Ba_xSr_yCa_{1-x-y})SiO_3$ ($0 \leq x,y \leq 1$), borides such as $B_2O_3$, and oxides such as $Li_2O$, $MoO_3$, $V_2O_5$ and the like. The content of the frit is within the range of 0.01 mole to 15.00 mole parts with respect to 100 mole parts of the main component.

Figure 1:
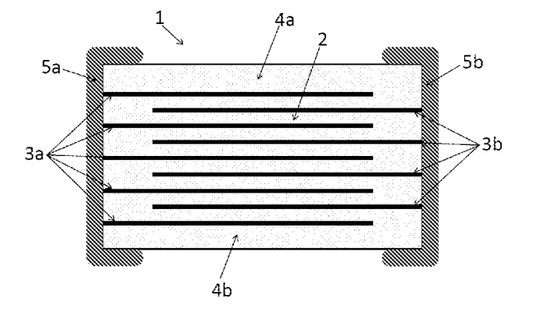
FIG. 1 is a schematic view in cross section of a multilayer ceramic capacitor using the dielectric ceramic composition according to the present invention.

To obtain the disclosed dielectric ceramic composition in the ceramic layers 2 in the multilayer ceramic capacitor 1 shown in FIG. 1, $K_2CO_3$, $Na_2CO_3$, $Li_2CO_3$, $BaCO_3$, $SrCO_3$, $CaCO_3$, $Ta_2O_5$, $Nb_2O_5$, $TiO_2$, $ZrO_2$, $HfO_2$, transition metal oxide, rare-earth oxide, and a frit are prepared as starting ceramic raw materials. Further, as raw material compounds containing respective constituent elements in the disclosed dielectric formula, not only oxides and carbonates, hydroxides could be also used. Specifically, the raw materials are not limited to any form. For example, transition metal element such as Mn can be added in terms of MnO, $MnO_2$, $MnCO_3$ and the like; this applies to all other raw materials. The main constituent raw materials are weighted to satisfy the disclosed composition formula, and then wet mixed together with suitable solvent such as water, ethanol, isopropanol, toluene, ethyl acetate, propyl acetate, butyl acetate, mineral spirits or other suitable hydrocarbon liquid, or a lend thereof via ball milling with yttrium stabilized zirconium media. After drying and calcination, a ceramic material prior sintering is thus obtained.

The calcined powders described herein are further wet milled with the addition of water and/or suitable organic additives such as binder, dispersant, solvent, plasticizer and the like, to form a ceramic slip. No particular limit is imposed on the choice of organic additives or the organic content used herein.

To obtain the ceramic slip described herein and the disclosed ceramic composition hereafter, the preparation step is not limited to the abovementioned process and could be in a way that a precursor material is made first by calcination and then mixed with precursors or dopants contain other constituent elements of the desired composition to form a ceramic slip with suitable organic additives before sintering.

Examples 1 to 4 are given for illustration, but the illustrations do not limit the scope of the invention. Modifications apparent to one having skill in the art are subsumed within the scope of the invention.

Example 1

$K_2CO_3$, $Na_2CO_3$, $Li_2CO_3$, $BaCO_3$, $CaCO_3$, $Ta_2O_5$, $Nb_2O_5$, and $ZrO_2$ are mixed as starting ceramic raw materials to prepare a precursor after calcination at 700° C. to 1200° C., wherein the starting ceramic materials comprise:
from 30.7 mol % to 70.4 mol % of K from $K_2CO_3$;
from 29.5 mol % to 69.8 mol % Na from $Na_2CO_3$;
from 0.1 mol % to 10.1 mol % Li from $Li_2CO_3$;
from 0.5 mol % to 12.5 mol % Ba from $BaCO_3$;
from 0.1 mol % to 13.6 mol % Ca from $CaCO_3$;
from 0.05 mol % to 27.70 mol % Ta from $Ta_2O_5$;
from 70.2 mol % to 95.5 mol % Nb from $Nb_2O_5$;
from 0.1 mol % to 23.1 mol % Zr from $ZrO_2$;
and then a mixture of transition metal oxide, rare-earth oxide, and frit comprises:
from 0.1 mol % to 5.0 mol % Mn from $MnCO_3$;
from 0.2 mol % to 4.9 mol % Pr from $Pr_6O_{11}$;
from 0.01 mol % to 5.30 mol % frit from $SiO_2$;
is added as dopants together with suitable organic additives to form a ceramic slip.

Example 2

$K_2CO_3$, $Na_2CO_3$, $Li_2CO_3$, $BaCO_3$, $SrCO_3$, $CaCO_3$, $Ta_2O_5$, $Nb_2O_5$, $ZrO_2$, and transition metal oxides such as MnO and $WO_3$ are mixed as starting ceramic raw materials to prepare a precursor after calcination at 700° C. to 1200° C., wherein the starting ceramic materials comprise:
from 30.7 mol % to 70.4 mol % of K from $K_2CO_3$;
from 29.5 mol % to 69.8 mol % Na from $Na_2CO_3$;
from 0.1 mol % to 10.1 mol % Li from $Li_2CO_3$;
from 0.5 mol % to 12.5 mol % Ba from $BaCO_3$;
from 0.3 mol % to 11.1 mol % Sr from $SrCO_3$;
from 0.1 mol % to 13.6 mol % Ca from $CaCO_3$;
from 0.05 mol % to 27.70 mol % Ta from $Ta_2O_5$;
from 70.2 mol % to 95.5 mol % Nb from $Nb_2O_5$;
from 0.1 mol % to 23.1 mol % Zr from $ZrO_2$;
from 0.1 mol % to 4.9 mol % Mn from MnO;
from 0.1 mol % to 2.2 mol % W from $WO_3$;
and then a mixture of rare-earth oxide and frit comprises:
from 0.2 mol % to 4.9 mol % Y from $Y_2O_3$;
from 0.01 mol % to 5.30 mol % frit from $CaSiO_3$;
is added as dopants together with suitable organic additives to form a ceramic slip.

Example 3

$K_2CO_3$, $Na_2CO_3$, $BaCO_3$, $SrCO_3$, $CaCO_3$, $Nb_2O_5$, $ZrO_2$, and rare-earth oxide such as $Y_2O_3$ are mixed as starting ceramic raw materials to prepare a precursor after calcination at 700° C. to 1200° C., wherein the starting ceramic materials comprise:
from 30.7 mol % to 70.4 mol % of K from $K_2CO_3$;
from 29.5 mol % to 69.8 mol % Na from $Na_2CO_3$;
from 0.5 mol % to 12.5 mol % Ba from $BaCO_3$;
from 0.3 mol % to 11.1 mol % Sr from $SrCO_3$;
from 0.1 mol % to 13.6 mol % Ca from $CaCO_3$;
from 70.2 mol % to 95.5 mol % Nb from $Nb_2O_5$;
from 0.1 mol % to 23.1 mol % Zr from $ZrO_2$;
from 0.2 mol % to 4.9 mol % Y from $Y_2O_3$;
and then a mixture of transition metal oxide and frit comprise:
from 0.1 mol % to 5.0 mol % Mn from $MnO_2$;
from 0.01 mol % to 5.30 mol % frit from $B_2O_3$;
is added as dopants together with suitable organic additives to form a ceramic slip.

Example 4

$K_2CO_3$, $Na_2CO_3$, $BaCO_3$, $SrCO_3$, $CaCO_3$, $Ta_2O_5$, $Nb_2O_5$, $TiO_2$, $ZrO_2$, rare-earth oxide such as $Nd_2O_3$, and transition metal oxide such as MnO are mixed as starting ceramic raw materials to prepare a precursor after calcination at 700° C. to 1200° C., wherein the starting ceramic materials comprise:
from 30.7 mol % to 70.4 mol % of K from $K_2CO_3$;
from 29.5 mol % to 69.8 mol % Na from $Na_2CO_3$;
from 0.5 mol % to 12.5 mol % Ba from $BaCO_3$;
from 0.3 mol % to 11.1 mol % Sr from $SrCO_3$;
from 0.1 mol % to 13.6 mol % Ca from $CaCO_3$;
from 0.05 mol % to 27.70 mol % Ta from $Ta_2O_5$;
from 70.2 mol % to 95.5 mol % Nb from $Nb_2O_5$;
from 0.05 mol % to 4.70 mol % Ti from $TiO_2$;
from 0.1 mol % to 23.1 mol % Zr from $ZrO_2$;
from 0.2 mol % to 4.9 mol % La from $Nd_2O_3$;
from 0.1 mol % to 4.9 mol % Mn from MnO;
and then a frit of LiF from 0.01 mol % to 5.30 mol % is added as dopant together with suitable organic additives to form a ceramic slip.

Further, dopants like transition metal compounds, rare-earth compounds and frit can be also added in two separate steps to obtain the desired dielectric composition disclosed in this invention. It means that partial amount of transition metal compound, rare-earth compound, and/or frit is firstly added in the raw materials to prepare a precursor after calcination at 700° C. to 1200° C., referred to as step 1; and then another amount of transition metal compound, rare-earth compound, and/or frit is further added to the precursor together with suitable organic additives to form a ceramic slip, referred to as step 2. The transition metal compound added in step 1 and in step 2 could be the same compound containing the same target transition metal element or could be different compounds containing different target transition metal elements. This also applies to the rare-earth compound and frit if they are added separately in step 1 and step 2. The total amount of transition metal element, rare-earth element, and frit added in step 1 and step 2 satisfies the value range specified in formula (1).

Examples 5 to 10 are given for illustration, but the illustrations do not limit the scope of the invention. Modifications apparent to one having skill in the art are subsumed within the scope of the invention.

Example 5

$K_2CO_3$, $Na_2CO_3$, $BaCO_3$, $SrCO_3$, $CaCO_3$, $Nb_2O_5$, $ZrO_2$, $HfO_2$ and transition metal oxides such as $MoO_3$ are mixed as starting ceramic raw materials to prepare a precursor after calcination at 700° C. to 1200° C., wherein the starting ceramic materials comprise:
from 30.7 mol % to 70.4 mol % of K from $K_2CO_3$;
from 29.5 mol % to 69.8 mol % Na from $Na_2CO_3$;
from 0.5 mol % to 12.5 mol % Ba from $BaCO_3$;
from 0.3 mol % to 11.1 mol % Sr from $SrCO_3$;
from 0.1 mol % to 13.6 mol % Ca from $CaCO_3$;
from 70.2 mol % to 95.5 mol % Nb from $Nb_2O_5$;
from 0.1 mol % to 19.7 mol % Zr from $ZrO_2$;
from 0.1 mol % to 5.4 mol % Hf from $HfO_2$;
from 0.1 mol % to 2.2 mol % Mo from $MoO_3$;

and then a mixture of transition metal oxide, rare-earth oxide, and frit comprises of:
from 0.1 mol % to 5.0 mol % Mn from $MnO_2$;
from 0.2 mol % to 4.9 mol % Dy from $Dy_2O_3$;
from 0.01 mol % to 5.30 mol % frit from LiF;
is further added as dopants together with suitable organic additives to form a ceramic slip.

Example 6

$K_2CO_3$, $Na_2CO_3$, $SrCO_3$, $CaCO_3$, $Ta_2O_5$, $Nb_2O_5$, $ZrO_2$, $HfO_2$ and rare-earth oxides such as $Yb_2O_3$ are mixed as starting ceramic raw materials to prepare a precursor after calcination at 700° C. to 1200° C., wherein the starting ceramic materials comprising:
from 30.7 mol % to 70.4 mol % of K from $K_2CO_3$;
from 29.5 mol % to 69.8 mol % Na from $Na_2CO_3$;
from 0.3 mol % to 13.2 mol % Sr from $SrCO_3$;
from 0.1 mol % to 13.6 mol % Ca from $CaCO_3$;
from 0.05 mol % to 27.70 mol % Ta from $Ta_2O_5$;
from 70.2 mol % to 95.5 mol % Nb from $Nb_2O_5$;
from 0.1 mol % to 19.7 mol % Zr from $ZrO_2$;
from 0.1 mol % to 5.4 mol % Hf from $HfO_2$;
from 0.2 mol % to 1.8 mol % Yb from $Yb_2O_3$;
and then a mixture of transition metal oxide, rare-earth oxide, and frit comprises:
from 0.2 mol % to 5.0 mol % Ce from $CeO_2$;
from 0.1 mol % to 4.9 mol % Mn from $MnO_2$;
from 0.01 mol % to 5.30 mol % frit from $CaSiO_3$;
is further added as dopants together with suitable organic additives to form a ceramic slip.

Example 7

$K_2CO_3$, $Na_2CO_3$, $BaCO_3$, $SrCO_3$, $Nb_2O_5$, $ZrO_2$, and transition metal oxides such as $MnO_2$ are mixed as starting ceramic raw materials to prepare a precursor after calcination at 700° C. to 1200° C., wherein the starting ceramic materials comprise:
from 30.7 mol % to 70.4 mol % of K from $K_2CO_3$;
from 29.5 mol % to 69.8 mol % Na from $Na_2CO_3$;
from 0.5 mol % to 12.5 mol % Ba from $BaCO_3$;
from 0.3 mol % to 11.1 mol % Sr from $SrCO_3$;
from 70.2 mol % to 95.5 mol % Nb from $Nb_2O_5$;
from 0.1 mol % to 19.7 mol % Zr from $ZrO_2$;
from 0.1 mol % to 1.6 mol % Mn from $MnO_2$;
and then a mixture of transition metal oxides, rare-earth oxide, and frit comprising:
from 0.1 mol % to 2.2 mol % Mo from $MoO_3$;
from 0.2 mol % to 4.9 mol % Y from $Y_2O_3$;
from 0.01 mol % to 5.30 mol % frit from KF;
is further added as dopants together with suitable organic additives to form a ceramic slip.

Example 8

$K_2CO_3$, $Na_2CO_3$, $Li_2CO_3$, $SrCO_3$, $CaCO_3$, $Ta_2O_5$, $Nb_2O_5$, $ZrO_2$, transition metal oxides such as $WO_3$, and frit, such as $SiO_2$, are mixed as starting ceramic raw materials to prepare a precursor after calcination at 700° C. to 1200° C., wherein the starting ceramic materials comprising:
from 30.7 mol % to 70.4 mol % of K from $K_2CO_3$;
from 29.5 mol % to 69.8 mol % Na from $Na_2CO_3$;
from 0.1 mol % to 10.1 mol % Li from $Li_2CO_3$;
from 0.3 mol % to 11.1 mol % Sr from $SrCO_3$;
from 0.1 mol % to 13.6 mol % Ca from $CaCO_3$;
from 0.05 mol % to 27.70 mol % Ta from $Ta_2O_5$;
from 70.2 mol % to 95.5 mol % Nb from $Nb_2O_5$;
from 0.1 mol % to 23.1 mol % Zr from $ZrO_2$;
from 0.1 mol % to 2.2 mol % W from $WO_3$;
from 0.01 mol % to 2.20 mol % frit from $SiO_2$;
and then a mixture of transition metal oxide, rare-earth oxide, and frit comprising:
from 0.1 mol % to 5.0 mol % Mn from $MnO_2$;
from 0.2 mol % to 4.9 mol % Y from $Y_2O_3$;
from 0.01 mol % to 5.30 mol % frit from $SiO_3$;
is further added as dopants together with suitable organic additives to form a ceramic slip.

Example 9

$K_2CO_3$, $Na_2CO_3$, $BaCO_3$, $CaCO_3$, $Nb_2O_5$, $ZrO_2$, transition metal oxides such as $MoO_3$, rare-earth oxide such as $Y_2O_3$, and frit, such as $SiO_2$, are mixed as starting ceramic raw materials to prepare a precursor after calcination at 700° C. to 1200° C., wherein the starting ceramic materials comprise:
from 30.7 mol % to 70.4 mol % of K from $K_2CO_3$;
from 29.5 mol % to 69.8 mol % Na from $Na_2CO_3$;
from 0.5 mol % to 12.5 mol % Ba from $BaCO_3$;
from 0.1 mol % to 13.6 mol % Ca from $CaCO_3$;
from 70.2 mol % to 95.5 mol % Nb from $Nb_2O_5$;
from 0.1 mol % to 19.7 mol % Zr from $ZrO_2$;
from 0.1 mol % to 2.2 mol % Mo from $MoO_3$;
from 0.1 mol % to 1.5 mol % Y from $Y_2O_3$;
from 0.01 mol % to 2.20 mol % frit from $SiO_2$;
and then a mixture of transition metal oxide, rare-earth oxide, and frit comprising:
from 0.1 mol % to 5.0 mol % Mn from $MnO_2$;
from 0.2 mol % to 4.9 mol % Y from $Y_2O_3$;
from 0.01 mol % to 5.30 mol % frit from $CaSiO_3$;
is further added as dopants together with suitable organic additives to form a ceramic slip.

Example 10

$K_2CO_3$, $Na_2CO_3$, $BaCO_3$, $SrCO_3$, $CaCO_3$, $Ta_2O_5$, $Nb_2O_5$, $ZrO_2$, $HfO_2$, and frit such as $SiO_2$ are mixed as starting ceramic raw materials to prepare a precursor after calcination at 700° C. to 1200° C., wherein the starting ceramic materials comprise:
from 30.7 mol % to 70.4 mol % of K from $K_2CO_3$;
from 29.5 mol % to 69.8 mol % Na from $Na_2CO_3$;
from 0.5 mol % to 12.5 mol % Ba from $BaCO_3$;
from 0.3 mol % to 11.1 mol % Sr from $SrCO_3$;
from 0.1 mol % to 13.6 mol % Ca from $CaCO_3$;
from 0.05 mol % to 27.70 mol % Ta from $Ta_2O_5$;
from 70.2 mol % to 95.5 mol % Nb from $Nb_2O_5$;
from 0.1 mol % to 19.7 mol % Zr from $ZrO_2$;
from 0.1 mol % to 5.4 mol % Hf from $HfO_2$;
from 0.01 mol % to 2.20 mol % frit from $SiO_2$;
and then a mixture of transition metal oxides, rare-earth oxide, and frit comprising:
from 0.1 mol % to 5.0 mol % Mn from $MnO_2$;
from 0.1 mol % to 3.4 mol % V from $V_2O_5$;
from 0.2 mol % to 4.9 mol % Pr from $Pr_6O_{11}$;
from 0.01 mol % to 5.30 mol % frit from LiF;
is further added as dopants together with suitable organic additives to form a ceramic slip.

Example 11

$K_2CO_3$, $Na_2CO_3$, $SrCO_3$, $Nb_2O_5$, and $ZrO_2$ are mixed as starting ceramic raw materials to prepare a precursor after calcination at 700° C. to 1200° C., wherein starting ceramic materials comprise:

from 30.7 mol % to 70.4 mol % of K from $K_2CO_3$;
from 29.5 mol % to 69.8 mol % Na from $Na_2CO_3$;
from 0.1 mol % to 15 mol % Sr from $SrCO_3$;
from 70.2 mol % to 95.5 mol % Nb from $Nb_2O_5$;
from 0.1 mol % to 23.1 mol % Zr from $ZrO_2$;
and then a mixture of transition metal oxide, rare-earth oxide, and frit comprises:
from 0.1 mol % to 5.0 mol % Mn from $MnCO_3$;
from 0.2 mol % to 4.9 mol % Eu from $Eu_2O_3$;
from 0.01 mol % to 5.3 mol % frit from $SiO_2$;
is added as dopants to the primary component.

Example 12—Comparative $K_2CO_3$, $Na_2CO_3$, $SrCO_3$, $Nb_2O_5$, and $ZrO_2$ are mixed as starting ceramic raw materials to prepare a precursor after calcination at 700° C. to 1200° C., wherein starting ceramic materials comprise:
from 30.7 mol % to 70.4 mol % of K from $K_2CO_3$;
from 29.5 mol % to 69.8 mol % Na from $Na_2CO_3$;
from 0.1 mol % to 11.7 mol % Sr from $SrCO_3$;
from 70.2 mol % to 95.5 mol % Nb from $Nb_2O_5$;
from 0.1 mol % to 13.5 mol % Zr from $ZrO_2$;
and then a mixture of transition metal oxide, rare-earth oxide, and frit comprises:
from 0.1 mol % to 5.0 mol % Mn from $MnCO_3$;
from 0.1 mol % to 4.2 mol % Ca from $CaCO_3$;
from 0.2 mol % to 2.5 mol % W from $WO_3$;
from 0.01 mol % to 3.3 mol % frit from $SiO_2$;
is added as dopants to the primary component.

Preparation of Dielectric Ceramic Disk Samples

Ceramic powders of primary component and sub-components were weighed in the ratios set forth in the examples, and wet-blended with a ball mill for 12 to 30 hours. Then, the blends were dried at 150° C. for 1 to 8 hours. Binder solution was added to the mixture in a mortar and then granulated to form granules. Then, the obtained granules were filled into a steel mold with a diameter of 13 mm and press-shaped at a pressure of 200 MPa to make a disk compact. The obtained compact was baked in air up to 375° C. for 10 to 100 hours to burn out the organic binder. Next, firing was applied in a reducing atmosphere to obtain a sintered disk. The firing was conducted at a peak temperature of 900 to 1350° C. for holding time of 1 to 6 hours. Then, silver electrodes were painted to the two surfaces of the sintered body to obtain disk ceramic capacitors corresponding to Example 11 and Example 12.

Preparation of MLCC Samples

Sintered MLCC chips were obtained with a standard 3.2 mm×1.6 mm size and Nickel internal electrodes by sintering at a temperature range of 900 to 1350° C. The sintered MLCC chip contained 19 active dielectric ceramic layers and 20 Nickel electrodes. The average thickness of said dielectric ceramic layer was determined to be around 12 μm.

Electrical Measurements

The electrostatic capacitance and dielectric loss were measured under conditions of 1 kHz and AC 1V in a temperature range of −55° C. to 200° C. for each composition. The temperature coefficient of capacitance (TCC) was calculated based on the following equation:

$$TCC(\%)=[(C_T-C_{25})/C_{25}]\times 100$$

wherein T is temperature at which the measurement was conducted, $C_T$ and $C_{25}$ are the electrostatic capacitances at temperature T and 25° C., respectively.

The contrast of the dielectric properties of disk samples with or without addition of rare-earth element is illustrated in TABLE 3.

TABLE 3

| | Dielectric constant at 25° C. | TCC in the range of −55° C. to 200° C. |
|---|---|---|
| Example 11 | 394 | −18.22% to 1.72% |
| * Example 12 | 89 | −16.94% to 5.21% |

The results presented in TABLE 3 illustrate the advantage of inventive Example 11, containing rare-earth element Eu, relative to comparative Example 12. Even though both examples provide a TCC within ±20% the comparative example does not achieve an adequate dielectric constant.

The dielectric constant as a function of firing temperatures of the disk samples made by the formulation of Example 11 is provided in TABLE 4.

TABLE 4

| Firing Temperature ° C. | Dielectric constant at 25° C. |
|---|---|
| 1050° C. | 394 |
| 1100° C. | 536 |
| 1150° C. | 619 |
| 1250° C. | 1607 |

The results of TABLE 4 demonstrate that a wide range of dielectric constants can be obtained by changing firing temperatures.

The contrast of the dielectric properties of MLCC samples made by the formulations shown in Example 11 and Example 12 is illustrated by the data presented in TABLE 5.

TABLE 5

| | Dielectric constant at 25° C. | TCC in the range of −55° C. to 200° C. |
|---|---|---|
| Example 11 | 1143 | −33.3% to −0.29% |
| Example 12 | 550 | −44.08% to −0.89% |

The results presented in TABLE 5 demonstrate that the addition of a rare-earth can largely improve the dielectric constant and narrow the TCC range.

A ceramic green sheet is further formed using a tape-casting process by spreading the slip onto a carrier film using a doctor blade method. After suitable drying process, internal electrodes 3a and 3b as illustrated in FIG. 1 are screen printed onto the ceramic green sheet using a conductive ink mainly containing base metals such as Ni, Cu or alloys thereof. Preferably, Ni or alloys primarily composed of Ni is used.

The obtained is further processed into a green chip via a stacking process. A plurality of ceramic green sheets without printed electrode onto it are stacked as bottom cover layers 4b; then a plurality of ceramic green sheets with printed electrode onto it are laminated in alternate directions, so as to form alternating electrodes 3a and 3b that terminate at opposite ends; and finally a certain number of ceramic green sheets without printed electrode are stacked as top cover layers 4a. The laminated body is then pressed at between 20° C. and 120° C. to improve adhesion of all stacked layers, and further cut into individual green chips.

The green chips are heated to 200° C. to 700° C. in atmospheric air or slightly reducing atmosphere for 0.1 to 100 hours to burn off the binders, and thereafter are sintered at a temperature between 900° C. to 1350° C. in a reducing atmosphere with an oxygen partial pressure between $10^{-4}$ atm to $10^{-16}$ atm. After sintering a reoxidation step may further apply to the chips by heating to a temperature no more than 1100° C. at an oxygen partial pressure between $10^{-3}$ atm to $10^{-14}$ atm. Thereby, a sintered chip is achieved.

The sintered chip is subjected to a corner rounding process by barrel or sand blast to expose internal electrodes formed at both end faces of the ceramic sintered body. Subsequently external electrodes 5a and 5b are formed at both end faces in such a way that: (1) copper terminations are formed by applying suitable copper paste at both end faces of the sintered chip and baked at a temperature between 600° C. to 1000° C. in nitrogen or slightly reducing atmosphere for 1 minutes to 60 minutes; (2) a nickel-plated layer and a tin-plated layer or other suitable solder composition are further plated on the copper terminations via the barrel plating method to enhance solderability and prevent oxidation of the copper external electrodes. Thus, a multi-layer ceramic capacitor 1 formed with base metal electrodes 3a and 3b and dielectric ceramic layers 2 comprising the disclosed dielectric composition in this invention is obtained.

The present invention discloses a dielectric ceramic composition that is possible for high temperature applications. Such a ceramic formulation is feasible to co-fire with base metal electrode in reducing atmosphere. Thereby, multilayered ceramic capacitors can be produced using the disclosed dielectric ceramic composition with base metal internal electrodes such as Ni.

Throughout the description listed ranges include all intermediate values having the same number of significant figures. By way of non-limiting example, a listed range of 0.01 to 0.05 includes: 0.01, 0.02, 0.03, 0.04 and 0.05. In the event that a range is listed with the listing having two numbers with different significant figures the one having the smallest increment significant figure determines the significant figures for both. By way of non-limiting example, if a range is listed as 1.0 to 5 it is intended to refer to all numbers from 1.0 to 5.0.

The following documents are incorporate herein by reference: U.S. Pat. No. 9,564,271 to Banno et al.; WO 2018-062084 to Banno; JP 2020-29375 A to Takahashi et al.; Base metal co-fired multilayer piezoelectrics, Gao et al., Actuators, volume 5, issue 1, page 8, 2016;

The invention will be described with reference to the figures which are integral, but non-limiting, part of the specification provided for clarity of the invention. Throughout the various figures similar elements will be numbered according. The invention has been described with reference to preferred embodiments without limit thereto. One of skill in the art would realize additional embodiments which are described and set forth in the claims appended hereto.

The invention claimed is:

1. A dielectric ceramic composition comprising a primary component defined by:

$$(K_xNa_yLi_zA_{1-x-y-z})_m(Nb_uTa_v)O_3$$

wherein:
A is at least one element selected from the group consisting of Ca, Sr, and Ba;
B is at least one element selected from the group consisting of Ti, Zr, Hf and Sn;
x, y, z, u, v, and w are molar fractions of respective elements;
m is the molar ratio of A-site and B-site elements;
$0.95 \le m \le 1.05$;
$0.05 \le x \le 0.90$;
$0.05 \le y \le 0.90$;
$0.00 \le z \le 0.03$;
$0 < u < 1$;
$0.0 \le w \le 0.3$; and
$u+v+w=1$;
a first accessory ingredient comprising at least one rare-earth element selected from the group consisting of Y, Sc, La, Ce, Pr, Nd, Sm, Eu, Gd, Tb, Dy, Ho, Er, Tm, Yb and Lu;
a second accessory ingredient comprising at least one transition metal element selected from the group consisting of V, Cr, Mo, W, Mn, Fe, Co, Ni, Cu, and Zn; and
a third accessory ingredient comprising a frit.

2. The dielectric ceramic composition of claim 1 comprising no more than 10 mol % of said at least one rare-earth element with respect to 100 mole % of said primary component.

3. The dielectric ceramic composition of claim 1 comprising 0.05 to 10 mole % of said at least one transition metal element with respect to 100 mole % of said primary component.

4. The dielectric ceramic composition of claim 1 comprising 0.01 mole to 15.00 mole % of said frit with respect to 100 mole % of said primary component.

5. The dielectric ceramic composition of claim 1 wherein said frit comprises a material selected from the group consisting of fluorides, silicates, borides, and oxides.

6. The dielectric ceramic composition of claim 1 having a temperature coefficient of capacitance of ±50% over a temperature range from −55° C. to 200° C.

7. The dielectric ceramic composition of claim 6 having a temperature coefficient of capacitance of ±20% over a temperature range from −55° C. to 200° C.

8. The dielectric ceramic composition of claim 1 having a dielectric constant of at least 300 at 25° C.

9. The dielectric ceramic composition of claim 8 having a dielectric constant of at least 1000 at 25° C.

10. A multilayered ceramic capacitor comprising:
a plurality of dielectric ceramic layers wherein each layer of said layers has a dielectric composition comprising a primary component defined by:

$$(K_xNa_yLi_zA_{1-x-y-z})_m(Nb_uTa_v)O_3$$

wherein:
A is at least one element selected from the group consisting of Ca, Sr, and Ba;
B is at least one element selected from the group consisting of Ti, Zr, Hf and Sn;
x, y, z, u, v, and w are molar fractions of respective elements;
m is the molar ratio of A-site and B-site elements;
$0.95 \le m \le 1.05$;
$0.05 \le x \le 0.90$;
$0.05 \le y \le 0.90$;
$0.00 \le z \le 0.03$;
$0 < u < 1$;
$0.0 \le w \le 0.3$; and
$u+v+w=1$;

a first accessory ingredient comprising at least one rare-earth element selected from the group consisting of Y, Sc, La, Ce, Pr, Nd, Sm, Eu, Gd, Tb, Dy, Ho, Er, Tm, Yb and Lu;

a second accessory ingredient comprising at least one transition metal element selected from the group consisting of V, Cr, Mo, W, Mn, Fe, Co, Ni, Cu, and Zn; and a third accessory ingredient comprising a frit;

and a plurality of internal electrodes comprising base metals of Ni, Cu or alloys thereof;

and a pair of external electrodes formed at each end of said multilayered ceramic capacitor.

11. The multilayered ceramic capacitor of claim 10 comprising no more than 10 mol % of said at least one rare-earth element with respect to 100 mole % of said primary component.

12. The multilayered ceramic capacitor of claim 10 comprising 0.05 to 10 mole % of said at least one transition metal element with respect to 100 mole % of said primary component.

13. The multilayered ceramic capacitor of claim 10 comprising 0.01 mole to 15.00 mole % of said frit with respect to 100 mole % of said primary component.

14. The multilayered ceramic capacitor of claim 10 wherein said frit comprises a material selected from the group consisting of fluorides, silicates, borides, and oxides.

15. The multilayered ceramic capacitor of claim 10 wherein said dielectric composition has a temperature coefficient of capacitance of ±50% over a temperature range from −55° C. to 200° C.

16. The multilayered ceramic capacitor of claim 15 wherein said dielectric composition has a temperature coefficient of capacitance of ±20% over a temperature range from −55° C. to 200° C.

17. The multilayered ceramic capacitor of claim 10 wherein said dielectric composition has a dielectric constant of at least 300 at 25° C.

18. The multilayered ceramic capacitor of claim 17 wherein said dielectric composition has a dielectric constant of at least 1000 at 25° C.

19. A method of forming a multilayered ceramic capacitor comprising:

forming a dielectric ceramic precursor;

interleaving layers of said dielectric ceramic precursor with layers of metal to form a stack;

compressing said stack and sintering said dielectric ceramic precursor to form dielectric ceramic layers having a dielectric composition defined by:

a primary component defined as:

$(K_xNa_yLi_zA_{1-x-y-z})_m(Nb_uTa_v)O_3$ wherein:

A is at least one element selected from the group consisting of Ca, Sr, and Ba;

B is at least one element selected from the group consisting of Ti, Zr, Hf and Sn;

x, y, z, u, v, and w are molar fractions of respective elements;

m is the molar ratio of A-site and B-site elements;

$0.95 \leq m \leq 1.05$;

$0.05 \leq x \leq 0.90$;

$0.05 \leq y \leq 0.90$;

$0.00 \leq z \leq 0.03$;

$0 < u < 1$;

$0.0 \leq w \leq 0.3$; and $u+v+w=1$;

a first accessory ingredient comprising at least one rare-earth element selected from the group consisting of Y, Sc, La, Ce, Pr, Nd, Sm, Eu, Gd, Tb, Dy, Ho, Er, Tm, Yb and Lu;

a second accessory ingredient comprising at least one transition metal element selected from the group consisting of V, Cr, Mo, W, Mn, Fe, Co, Ni, Cu, and Zn; and a third accessory ingredient comprising a frit.

20. The method of forming a multilayered ceramic capacitor of claim 19 wherein said layers of dielectric ceramic precursor are prepared as a ceramic green paste comprising a mixture of inorganic materials and organic additives, wherein the inorganic materials comprise of at least one combination of precursor and dopant.

21. The method of forming a multilayered ceramic capacitor of claim 20 further comprising sintering said ceramic green paste.

22. The method of forming a multilayered ceramic capacitor of claim 20, wherein the sintering is conducted at a temperature from 900° C. to 1350° C.

23. The method of forming a multilayered ceramic capacitor of claim 19 wherein said at least one transition metal element is selected from the group consisting of V, Cr, Mo, W, and Mn.

24. The method of forming a multilayered ceramic capacitor of claim 19 wherein said at least one rare-earth element is selected from the group consisting of Y, Sc, La, Ce, Pr, Nd, Sm, Eu, Gd, Tb, Dy, Ho, Er, Tm and Yb.

25. The method of forming a multilayered ceramic capacitor of claim 19 wherein said frit comprises at least one compound selected from the group consisting of fluorides, silicates, borides, and oxides.

26. The method of forming a multilayered ceramic capacitor of claim 19 wherein the sintering is conducted in an atmosphere with an oxygen partial pressure from $10^{-16}$ atm to $10^{-4}$ atm.

27. The method of forming a multilayered ceramic capacitor of claim 19 wherein said layers of metal comprise Ni, Cu or alloys thereof.

28. The method of forming a multilayered ceramic capacitor of claim 19 further comprising forming a pair of external electrodes at each end of said multilayered ceramic capacitor.

29. The method of forming a multilayered ceramic capacitor of claim 19 wherein said dielectric composition has a temperature coefficient of capacitance of ±50% over a temperature range from −55° C. to 200° C.

30. The method of forming a multilayered ceramic capacitor of claim 29 wherein said dielectric composition has a temperature coefficient of capacitance of ±20% over a temperature range from −55° C. to 200° C.

31. The method of forming a multilayered ceramic capacitor of claim 19 wherein said dielectric composition has a dielectric constant of at least 300 at 25° C.

32. The method of forming a multilayered ceramic capacitor of claim 31 wherein said dielectric composition has a dielectric constant of at least 1000 at 25° C.

* * * * *

UNITED STATES PATENT AND TRADEMARK OFFICE
CERTIFICATE OF CORRECTION

PATENT NO. : 11,935,698 B2
APPLICATION NO. : 17/586027
DATED : March 19, 2024
INVENTOR(S) : Hanzheng Guo and Abhijit Gurav Page 1 of 1

It is certified that error appears in the above-identified patent and that said Letters Patent is hereby corrected as shown below:

On the Title Page

In the ABSTRACT: Line 6, correct formula to read $(K_xNa_yLi_zA_{1-x-y-z})_m(Nb_uTa_vB_w)O_3$ In the Claims Column 13, Line 62, Claim 1, correct formula to read $(K_xNa_yLi_zA_{1-x-y-z})_m(Nb_uTa_vB_w)O_3$ Column 14, Line 52, Claim 10, correct formula to read $(K_xNa_yLi_zA_{1-x-y-z})_m(Nb_uTa_vB_w)O_3$ Column 15, Line 52, Claim 19, correct formula to read $(K_xNa_yLi_zA_{1-x-y-z})_m(Nb_uTa_vB_w)O_3$ Signed and Sealed this
Seventh Day of May, 2024

Katherine Kelly Vidal
*Director of the United States Patent and Trademark Office*